United States Patent
Lee et al.

(10) Patent No.: US 8,209,065 B2
(45) Date of Patent: Jun. 26, 2012

(54) STEERING LOGIC FOR SPACECRAFT SLEW MANEUVERS

(75) Inventors: Kangsik Lee, Redondo Beach, CA (US); Che-Hang Charles Ih, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 658 days.

(21) Appl. No.: 12/357,061

(22) Filed: Jan. 21, 2009

(65) Prior Publication Data

US 2010/0181430 A1      Jul. 22, 2010

(51) Int. Cl.
    *G01C 23/00*       (2006.01)
(52) U.S. Cl. ............................................. 701/3; 244/165
(58) Field of Classification Search .................. 701/3, 4, 701/13, 18, 23, 41; 244/165, 171
See application file for complete search history.

(56) References Cited

U.S. PATENT DOCUMENTS

| | | | | |
|---|---|---|---|---|
| 4,084,772 A | * | 4/1978 | Muhlfelder | 244/165 |
| 4,569,035 A | * | 2/1986 | Tomita | 365/122 |
| 5,523,663 A | * | 6/1996 | Tsuge et al. | 318/568.16 |
| 5,610,820 A | * | 3/1997 | Shankar et al. | 701/13 |
| 6,285,928 B1 | * | 9/2001 | Tilley et al. | 701/13 |
| 6,341,249 B1 | * | 1/2002 | Xing et al. | 701/13 |
| 2004/0135034 A1 | * | 7/2004 | Abel et al. | 244/165 |
| 2004/0140401 A1 | * | 7/2004 | Yamashita | 244/165 |
| 2007/0228218 A1 | * | 10/2007 | Brumfield et al. | 244/171 |
| 2009/0218449 A1 | * | 9/2009 | Kamiya et al. | 244/165 |
| 2009/0326858 A1 | * | 12/2009 | Ueda et al. | 702/141 |
| 2011/0153122 A1 | * | 6/2011 | Sharma et al. | 701/13 |

OTHER PUBLICATIONS

Creamer, et al., "Attitude Determination and Control of Clementine During Lunar Mapping," *Journal of Guidance, Control, and Dynamics*, 19(3):505-511, May-Jun. 1996.
Farrenkopf, "Optimal Open-Loop Maneuver Profiles for Flexible Spacecraft," *Journal of Guidance and Control*, 2(6):491-498, Nov.-Dec. 1979.

* cited by examiner

*Primary Examiner* — Thomas G. Black
*Assistant Examiner* — Shardul Patel
(74) *Attorney, Agent, or Firm* — Hope Baldauff Hartman, LLC (57) ABSTRACT

Spacecraft control modules can steer a spacecraft during a slew maneuver. The spacecraft control modules can receive a target attitude for the spacecraft slew maneuver. An angle between a current attitude and the target attitude may be determined. A smooth attitude offset profile with respect to a steering frame may be established from the current attitude to the target attitude. A smooth attitude command may be generated from the smooth attitude offset profile. The smooth attitude command may be applied to an attitude control module of the spacecraft.

15 Claims, 12 Drawing Sheets

STEERING LOGIC FOR SPACECRAFT SLEW MANEUVERS

FIELD OF THE DISCLOSURE

This disclosure relates generally to spacecraft control and navigation. This disclosure relates more specifically to an improved steering logic configured to support rapid, smooth spacecraft slew maneuvers.

BACKGROUND

A slew maneuver may be used to steer a spacecraft. The steering may be accomplished by altering an attitude of the spacecraft with respect to a reference frame. A slew maneuver can be carried out using one or more slew actuators. For example, reaction wheels or thrusters may be used as slew actuators.

A command to initiate a slew maneuver may originate from ground control or from a control system onboard the spacecraft. In one example, a slew control command may be issued to a satellite in order to turn the satellite with respect to its orbital velocity vector. In this example, the satellite steering may be performed to orient antennas, sensors, or solar panels for improved operation. Satellite steering may be also performed for navigation purposes.

Steering logic may be applied within a control system of the spacecraft to perform an attitude alteration or slew maneuver. A common challenge during such a maneuver is to avoid attitude overshoot, overcorrection, or oscillations at the end of the slew maneuver. Such control issues may introduce increased settling time into the maneuver. These difficulties may be particularly troublesome when maneuvering a larger spacecraft. Overshoot and unwanted oscillations around a target attitude may waste time and fuel. During rapid slew maneuvers, it may be particularly difficult to tune the angle and the rate limit to achieve smooth slew performance.

SUMMARY

Spacecraft control modules can steer a spacecraft during a slew maneuver. The spacecraft control modules can receive a target attitude for the spacecraft slew maneuver. An angle between a current attitude and the target attitude may be determined. A smooth attitude offset profile with respect to a steering frame may be established from the current attitude to the target attitude. A smooth attitude command may be generated from the smooth attitude offset profile. The smooth attitude command may be applied to an attitude control module of the spacecraft.

It should be appreciated that this Summary is provided to introduce a selection of concepts in a simplified form that are further described below in the Detailed Description. This Summary is not intended to be used to limit the scope of the claimed subject matter.

The features, functions, and advantages discussed herein may be achieved independently in various embodiments of the present description or may be combined in yet other embodiments, further details of which can be seen with reference to the following description and drawings.

DETAILED DESCRIPTION

The following detailed description discloses generating a smooth motion profile to provide rapid, smooth spacecraft slew maneuvers while avoiding, or reducing, overshoot and excess settling time. This description is most readily understood with reference to the attached drawings, in which like reference numbers may appear in different drawings to refer to similar elements.

Figure 1:
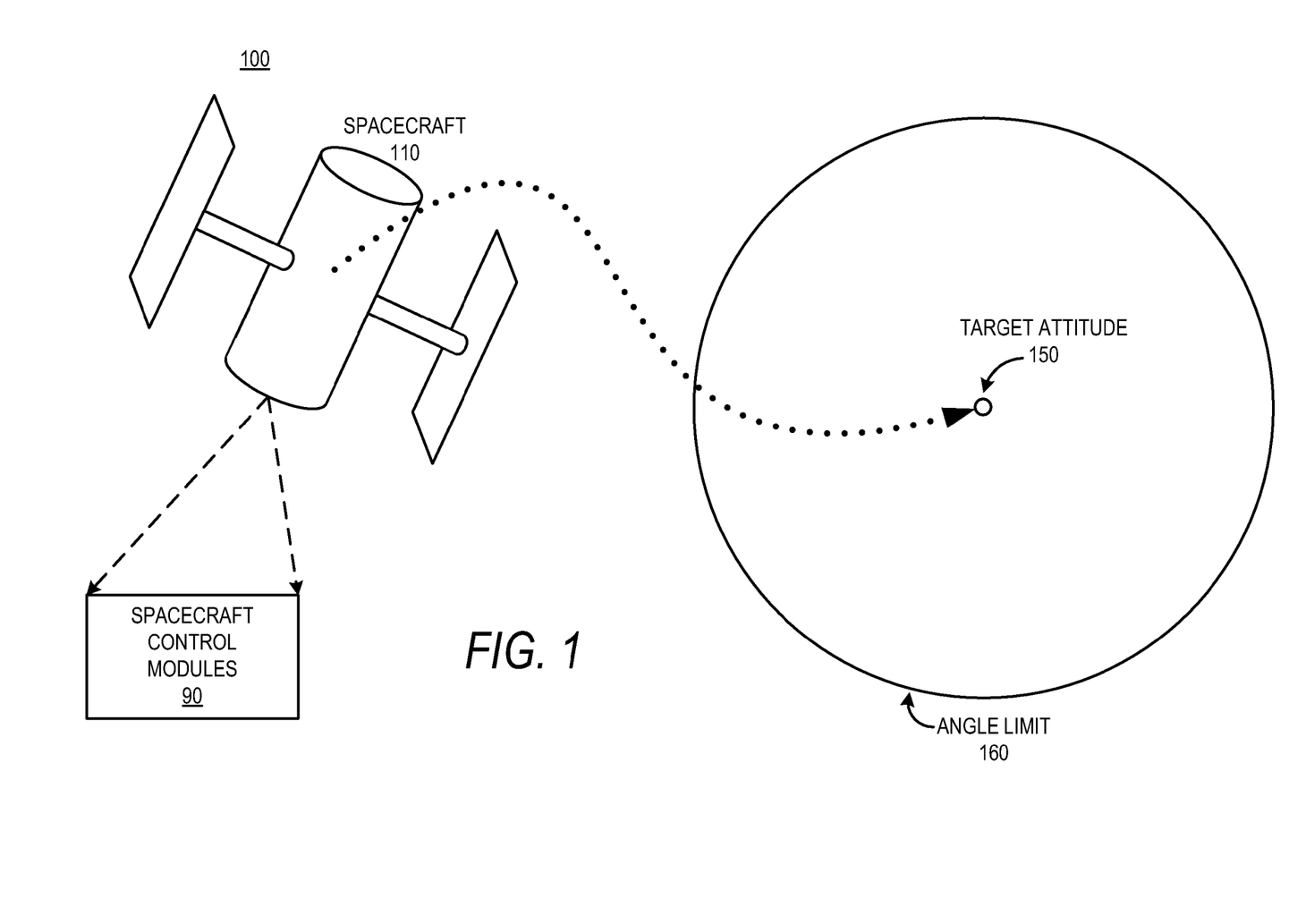
FIG. 1 is a diagram illustrating a spacecraft slew maneuver according to embodiments presented herein.

Turning first to FIG. 1, a diagram illustrates a spacecraft slew maneuver 100 according to embodiments disclosed herein. A spacecraft 110 may undergo a slew maneuver. For example, the slew may transition the spacecraft 110 from an initial attitude to a target attitude 150. Spacecraft control modules 90 may control the slew maneuver of the spacecraft 110. The spacecraft control modules 90 can implement the improved slew logic technologies presented herein. The spacecraft control modules 90 may be implemented as dedicated control circuitry, software or firmware associated with a general purpose processor, a digital signal processor, a core processor, a microcontroller, a multiprocessor, a flight computer, or any combination thereof.

The slew maneuver may be in response to a command provided by a ground control station on Earth. The command from the ground control station may include an offset quaternion command and a zero offset rate command. The coordinates within these commands may be provided with respect to a steering frame of the spacecraft 110.

An angle error may be established between the current attitude of the spacecraft 110 and the target attitude 150. While the angle error is greater than a specified angle limit 160, the spacecraft may enter a rate control stage. During the rate control stage, the spacecraft 110 may be maneuvered at its maximum specified rotational rate. As such, an acceleration command applied to the spacecraft 110 by its control system may be generated from a rate error only.

As the spacecraft 110 approaches its target attitude 150, the angle error will drop below the specified angle limit 160. Once within the angle limit 160, the spacecraft can enter a position and rate control stage. In the position and rate control stage, an acceleration command applied to the spacecraft 110 may be generated from both a position error and a rate error. The generation of smooth position and rate control commands can reduce, or substantially eliminate, overshoot in spacecraft attitude, and excessive settling time, while improving slew performance.

Figure 2:
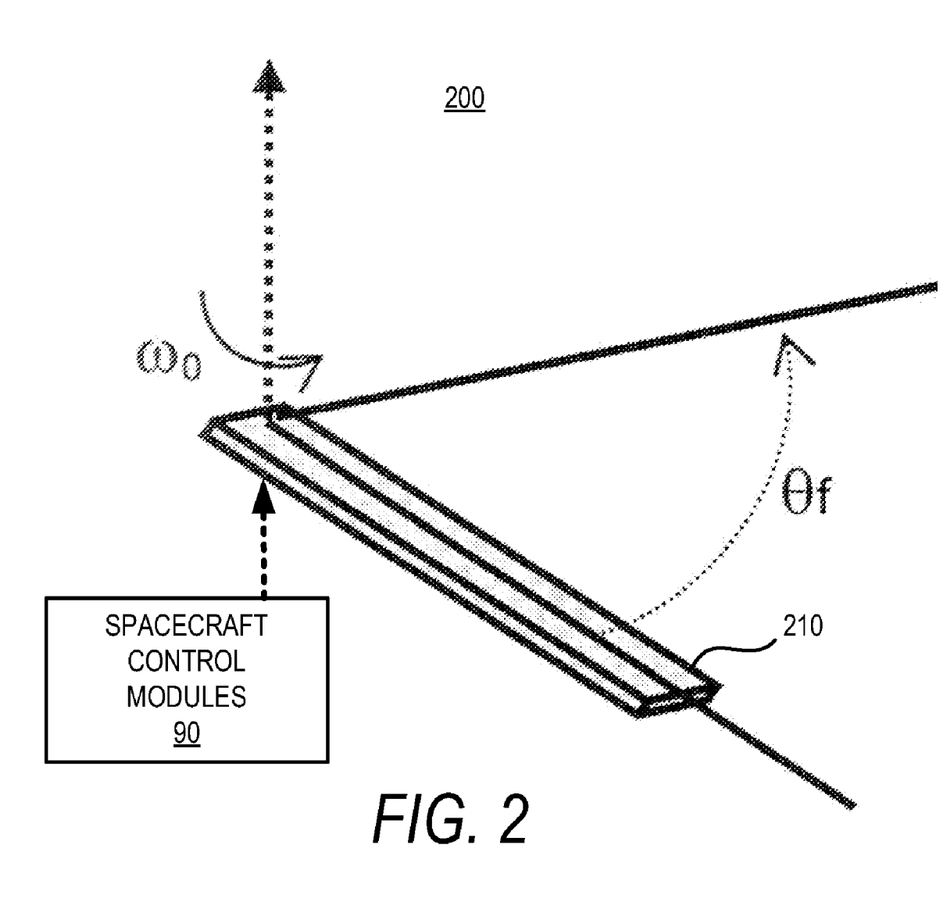
FIG. 2 is a diagram illustrating rotational motion of a slender bar according to embodiments presented herein.

Turning now to FIG. 2, a diagram 200 illustrates rotational motion of the spacecraft 110, abstracted in FIGS. 2 as a slender bar 210, according to embodiments disclosed herein. As an example of a slew maneuver, the rotational motion of the slender bar 210 about a fixed point in a plane may be considered. Spacecraft control modules 90 may control the slew maneuver of the slender bar 210 as an abstracted spacecraft 110. The slender bar 210 may have an initial position as illustrated in FIG. 2 and an initial angular velocity of $\omega_o$ degrees per second. A command may be issued to rotate the slender bar 210 from its initial position to a final angle $\theta_f$ with a final angular velocity of zero in a given amount of time $\Delta T$. A smooth control profile may be generated for the slew maneuver, such that the slender bar 210 may be rotated to the final position of $\theta_f$ degrees with the final angular velocity of zero while substantially reducing, or avoiding, overshoot or excessive settling time. An example candidate rate profile for providing a smooth deceleration to the target position may be given as:

$$\omega(t) = \frac{\omega_o}{2}\cos\left(\frac{\pi}{\Delta T}t\right) + \frac{\omega_o}{2}$$

The integral of which may provide an angle profile given as:

$$\theta(t) = \frac{\omega_o}{2}\frac{\Delta T}{\pi}\sin\left(\frac{\pi}{\Delta T}t\right) + \frac{\omega_o}{2}t + C$$

Solving this angle profile equation with boundary conditions such that $$\theta(0)=0, \text{ and } \theta(\Delta T)=\theta_f$$

yields the constant values:

$$c = 0, \text{ and } \omega_o = \frac{2\theta_f}{\Delta T}.$$

Substitution of these constants back into the angle profile equation provides the final angle profile given by:

$$\theta(t) = \frac{\theta_f}{\pi}\sin\left(\frac{\pi}{\Delta T}t\right) + \frac{\theta_f}{\Delta T}t.$$

Figure 3:
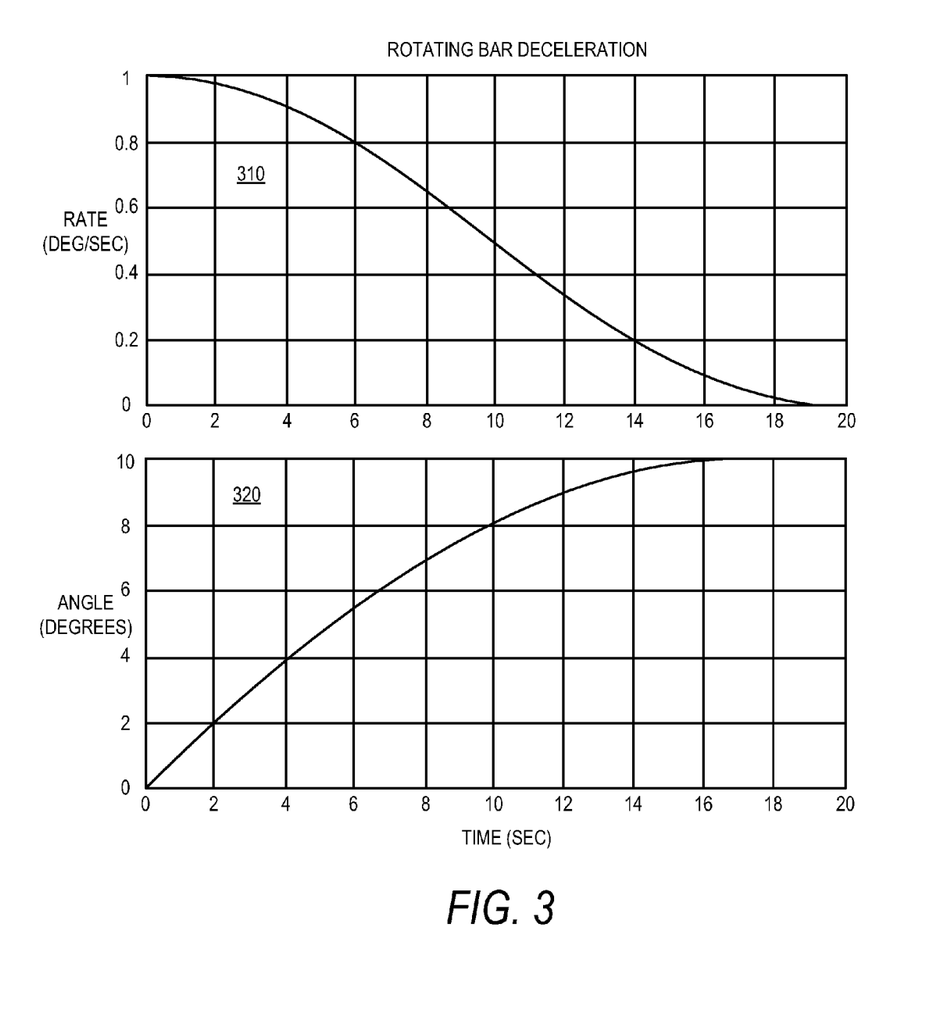
FIG. 3 is set of plots illustrating a deceleration profile of a slender bar according to embodiments presented herein.

These results are discussed in further detail with respect to FIG. 3.

Turning now to FIG. 3, a set of plots illustrate example deceleration profiles of the slender bar 210 according to embodiments disclosed herein. Plot 310 illustrates the example smooth rate profile as discussed with respect to FIG. 2. The rate in plot 310 smoothly decreases from $\omega_o$ to zero over a time period of approximately 20 seconds. Plot 320 illustrates the example smooth angle profile as discussed with respect to FIG. 2. The angle in plot 320 increases from the initial angle to a final position of $\theta_f$ over the time period of approximately 20 seconds. The example smooth rate profile 310 and example smooth angle profile 320 may support reduced overshoot and oscillation and the terminal of the slew maneuver while supporting improved rapid slew performance.

Figure 4:
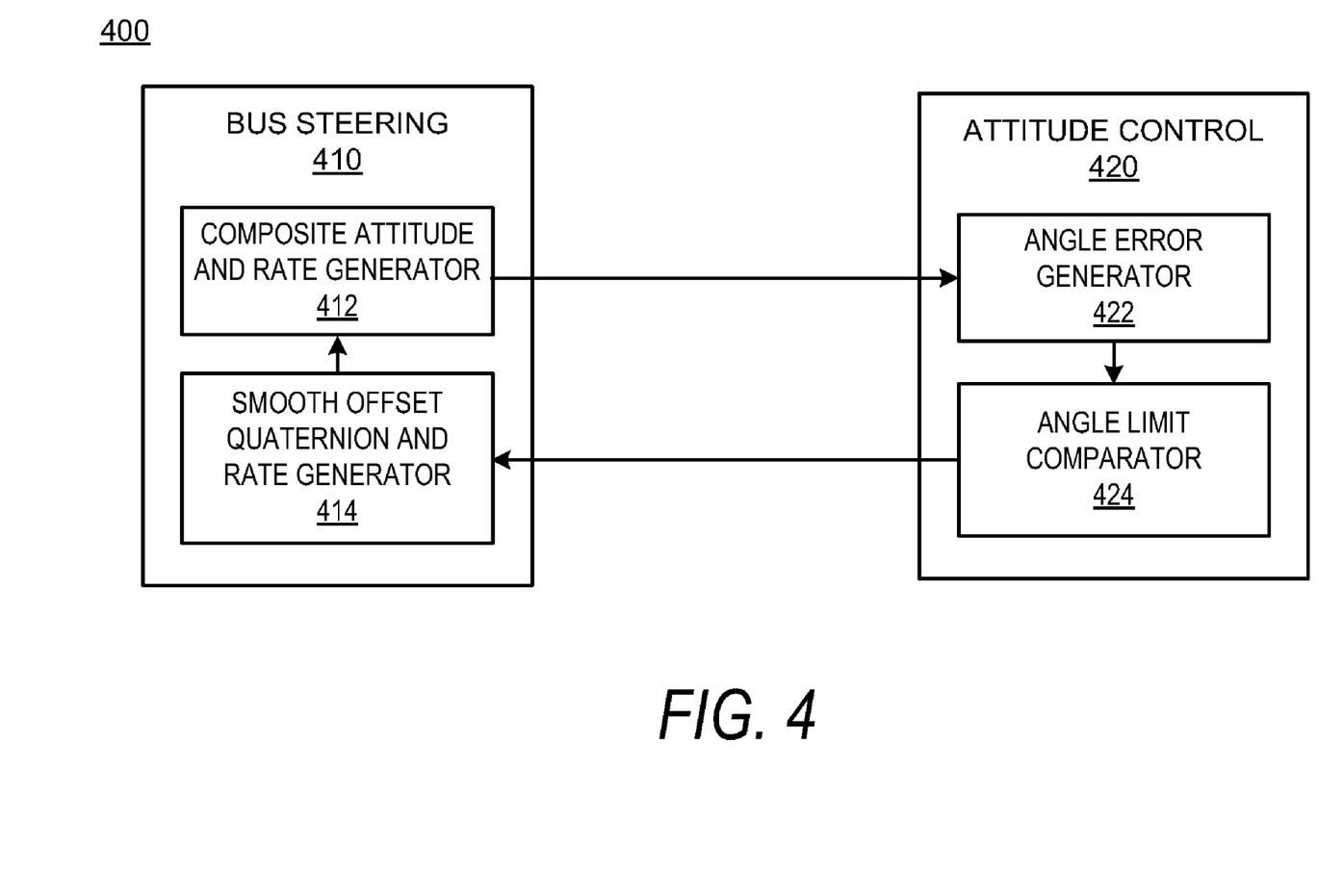
FIG. 4 is a functional block diagram illustrating aspects of bus steering and attitude control modules according to embodiments presented herein.

Turning now to FIG. 4, a functional block diagram 400 illustrates aspects of a bus steering module 410 and an attitude control module 420 according to embodiments disclosed herein. The block diagram 400 represents an example functional architecture for an improved steering logic. The improved steering logic can provide a smooth offset quaternion command and a smooth offset rate command. The steering logic may be implemented within spacecraft control modules 90 as discussed with respect to FIG. 1.

The steering logic architecture may comprise the bus steering module 410 and the attitude control module 420. Within the attitude control module 420, an angle error generator 422 may generate the angle error between an initial spacecraft attitude and the target attitude 150. In the context of rotational slew, the angle error may also be referred to as a position error. The angle error generator 422 may determine the angle error as an Euler angle from the error quaternion. The Euler angle of the angle error may be determined using Euler's rotation theorem. The Euler angle of the angle error may be a scalar variable. An angle limit comparator 424 can compare the angle error with the specified angle limit 160, which was discussed above in FIG. 1.

When the angle error is larger than the angle limit 160, the spacecraft 110 can enter a rate control stage. When the angle error is less than the angle limit 160, the spacecraft 110 may enter a position and rate control stage. Position and rate control may be carried out within the bus steering module 410 using a smooth offset quaternion and rate generator 414. When the position and rate control stage is activated for the spacecraft 110, a new offset quaternion command may be generated that is equal to the current estimated quaternion with respect to the steering frame. As such, the position error (angle error) can be established as zero.

An error quaternion may be established between the new offset quaternion command and the target attitude 150 quaternion. The Euler axis $\vec{e}$ and the Euler angle $\Delta\theta_f^{offset}$ may be calculated from the error quaternion. A magnitude of the current rate with respect to the steering frame may be calculated from the generated rate. This steering frame spacecraft rate may be determined by subtracting the rate of the steering frame with respect to the Earth centered inertial (ECI) frame from the spacecraft rate with respect to the ECI frame. The desired settling time $\Delta T$ may be determined by:

$$\Delta T = \frac{\omega_o}{\alpha_{desired}},$$

where $\alpha_{desired}$ is the desired deceleration magnitude.

The desired deceleration magnitude may be selected to result in rapid, smooth slew performance. These calculations may be performed at the beginning of the position and rate control stage of a slew maneuver. Subsequent time periods may be provided by real-time interrupts. At these time periods, smooth offset quaternion commands may be generated. For example, the following equations may be used for the smooth offset calculations:

$$\Delta\theta^{offset} = \frac{\Delta\theta_f^{offset}}{\pi}\sin\left(\frac{\pi}{\Delta T}t\right) + \frac{\Delta\theta_f^{offset}}{\Delta T}t$$

$$q(1) = \vec{e}(1) * \sin\left(\frac{\Delta\theta^{offset}}{2}\right)$$

$$q(2) = \vec{e}(2) * \sin\left(\frac{\Delta\theta^{offset}}{2}\right)$$

$$q(3) = \vec{e}(3) * \sin\left(\frac{\Delta\theta^{offset}}{2}\right)$$

$$q(4) = \cos\left(\frac{\Delta\theta^{offset}}{2}\right)$$

The angle command profile is that derived in the example discussed with respect to FIG. 2. The vector given by $\vec{e}$ can comprise the Euler axes. As there is no dependence upon rate ω in the smooth offset calculations above, slew steering may be supported even in the absence of rate information. This may be leveraged, for example, in the event of a gyro failure.

Additionally, subsequent real-time interrupts may generate offset rate commands. The offset rates may be determined from backward differences with respect to the offset quaternion commands. A composite attitude and rate generator 412 within the bus steering module 410 may generate a composite attitude and rate command. The composite attitude and rate command may be relative to the attitude determination reference frame. Generally, this attitude determination reference frame may be the ECI frame, although other frames may be applied. The composite attitude and rate command may be provided from the steering module 410 to the attitude control module 420.

Figure 5:
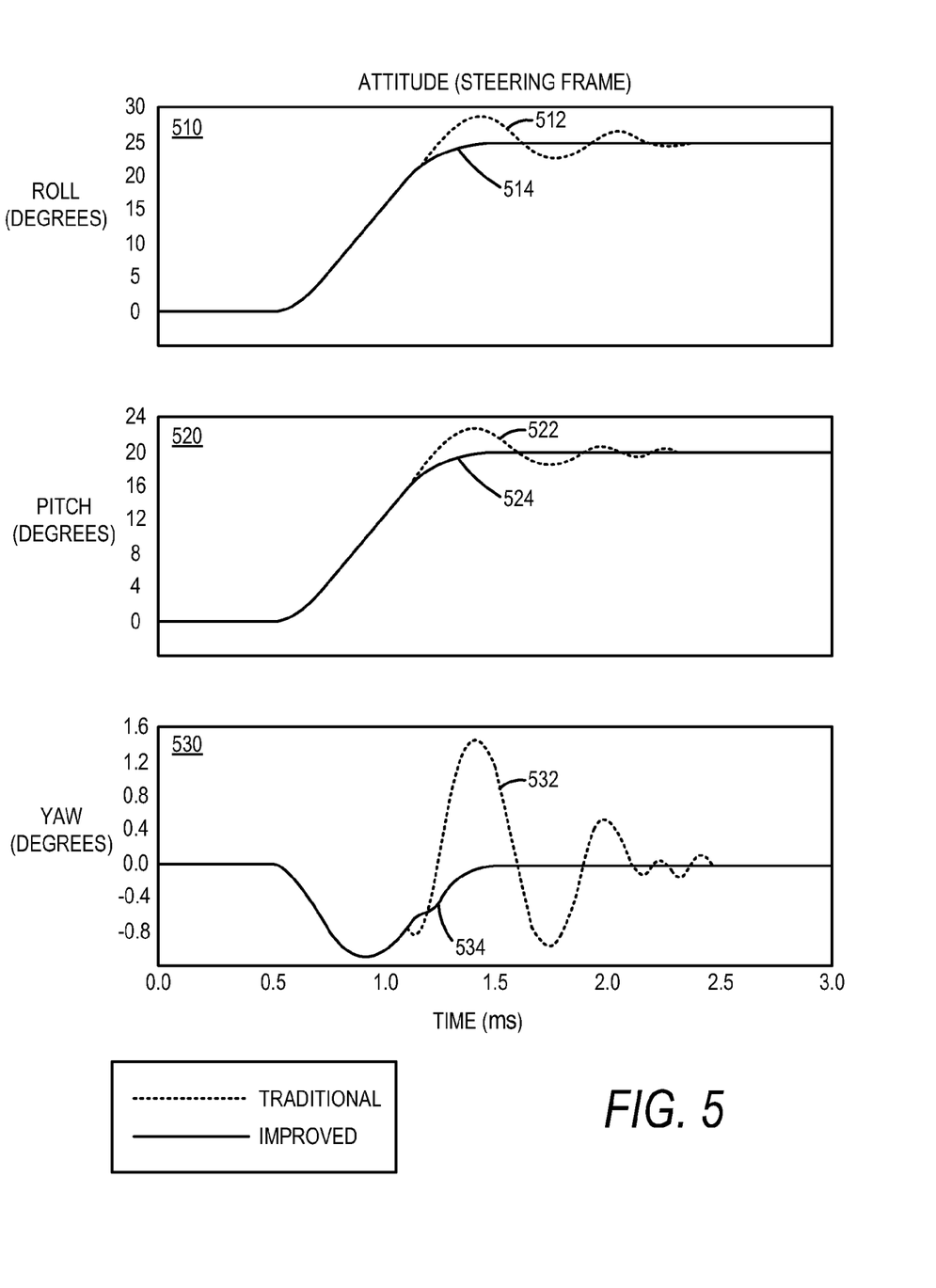
FIG. 5 is a set of plots illustrating the attitude of a spacecraft using both traditional and improved steering logic according to embodiments presented herein.

Turning now to FIG. 5, a set of plots illustrate the roll, pitch, and yaw attitude of a spacecraft (e.g., the spacecraft 110 in FIG. 1) using both traditional and improved steering logic according to embodiments disclosed herein. Plot 510 illustrates the roll in degrees of the spacecraft 110. Trace 512 represents an example roll component of an attitude profile generated from a traditional steering logic. Trace 514 illustrates an example roll component of an attitude profile generated from an improved steering logic disclosed herein. The oscillation in trace 512 represents overshoot and increased settling time often encountered while using traditional steering logic approaches, while trace 514 demonstrates improved smooth slew performance and reduced settling time for the slew maneuver.

Plot 520 illustrates the pitch in degrees of the spacecraft 110. Trace 522 represents an example pitch component of an attitude profile generated from a traditional steering logic. Trace 524 illustrates an example pitch component of an attitude profile generated from an improved steering logic disclosed herein. The oscillation in trace 522 represents overshoot and increased settling time often encountered while using traditional steering logic approaches, while trace 524 demonstrates improved smooth slew performance and reduced settling time for the slew maneuver.

Plot 530 illustrates the yaw in degrees of the spacecraft 110. Trace 532 represents an example yaw component of an attitude profile generated from a traditional steering logic. Trace 534 illustrates an example yaw component of an attitude profile generated from an improved steering logic disclosed herein. The oscillation in trace 532 represents overshoot and increased settling time often encountered while using traditional steering logic approaches, while trace 534 demonstrates improved smooth slew performance and reduced settling time for the slew maneuver.

Figure 6:
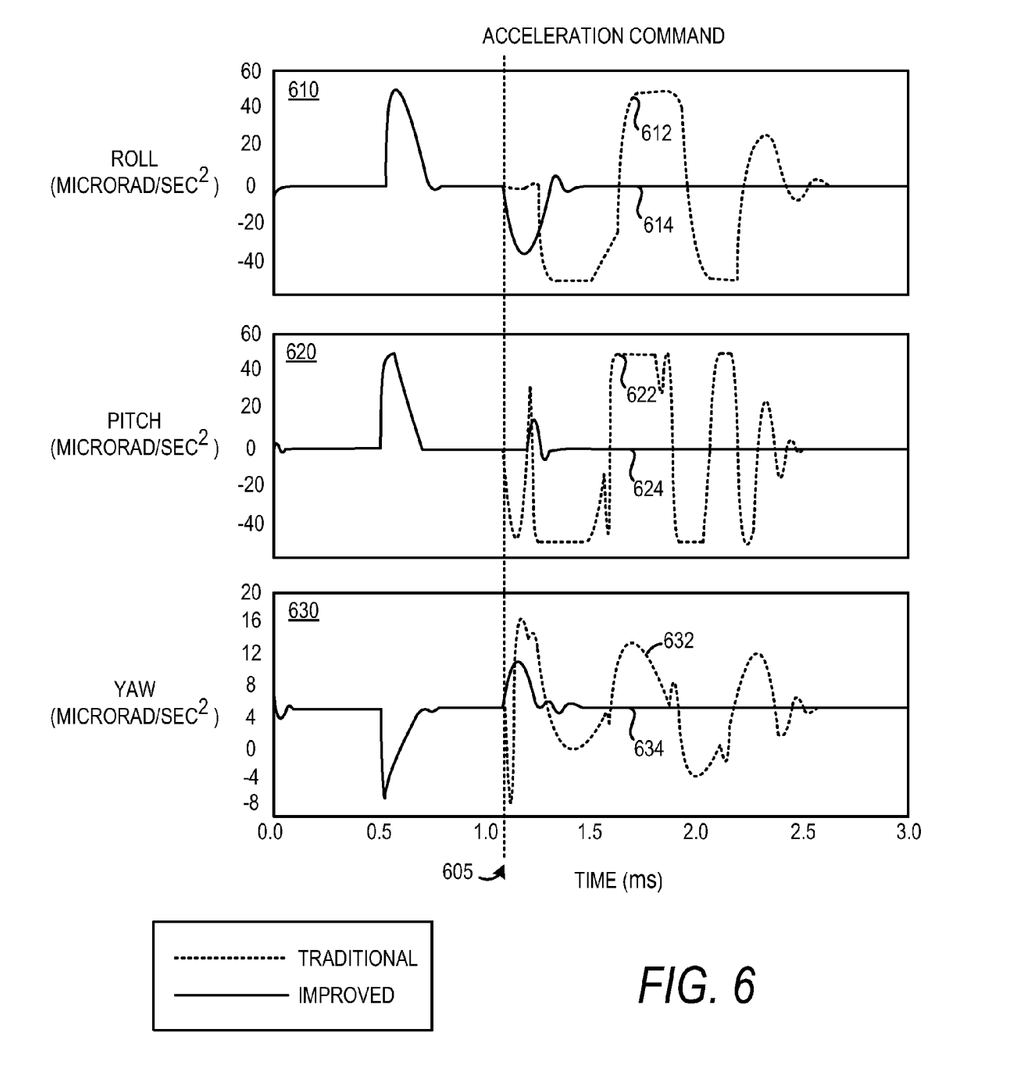
FIG. 6 is a set of plots illustrating acceleration command profiles for a spacecraft using both traditional and improved steering logic according to embodiments presented herein.

Turning now to FIG. 6, a set of plots illustrates acceleration command profiles for a spacecraft using both traditional and improved steering logic according to embodiments disclosed herein. Plot 610 illustrates the roll acceleration in microradians per second squared of the spacecraft 110. Trace 612 represents an example roll component of an acceleration command generated from a traditional steering logic. Trace 614 illustrates an example roll component of an acceleration command generated from an improved steering logic disclosed herein. The oscillation in trace 612 represents overshoot and increased settling time often encountered while using traditional steering logic approaches, while trace 614 demonstrates improved smooth slew performance and reduced settling time for the slew maneuver. Line 605 illustrates the point in time where the spacecraft 110 transitions from the rate control stage to the position and rate control stage. This is the time where the attitude of the spacecraft 110 crosses through the angle limit 160.

Plot 620 illustrates the pitch acceleration in microradians per second squared of the spacecraft 110. Trace 622 represents an example pitch component of an acceleration command generated from a traditional steering logic. Trace 624 illustrates an example pitch component of an acceleration command generated from an improved steering logic disclosed herein. The oscillation in trace 622 represents overshoot and increased settling time often encountered while using traditional steering logic approaches, while trace 624 demonstrates improved smooth slew performance and reduced settling time for the slew maneuver.

Plot 630 illustrates the yaw acceleration in microradians per second squared of the spacecraft 110. Trace 632 represents an example yaw component of an acceleration command generated from a traditional steering logic. Trace 634 illustrates an example yaw component of an acceleration command generated from an improved steering logic disclosed herein. The oscillation in trace 632 represents overshoot and increased settling time often encountered while using traditional steering logic approaches, while trace 634 demonstrates improved smooth slew performance and reduced settling time for the slew maneuver.

Figure 7:
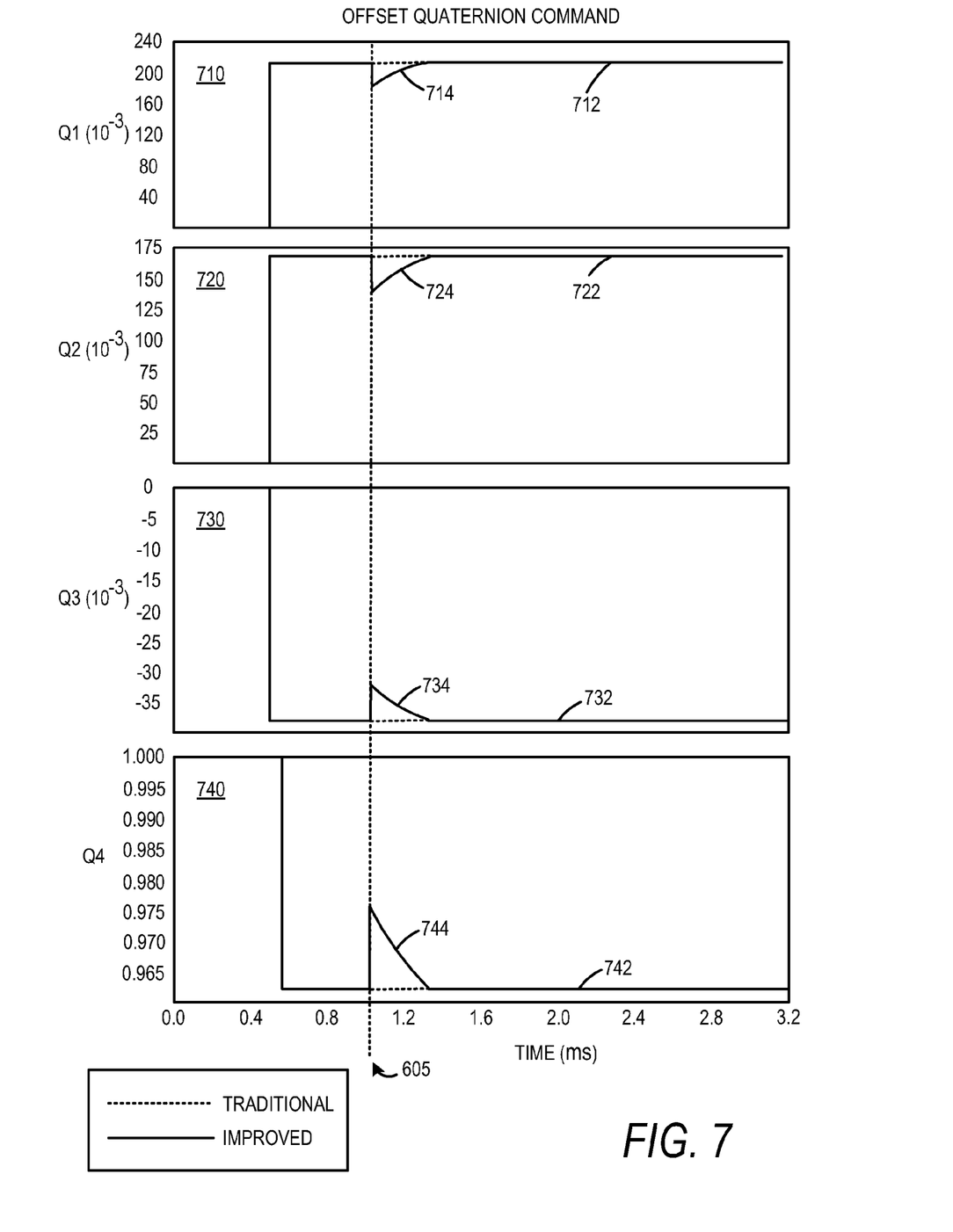
FIG. 7 is a set of plots illustrating offset quaternion command profiles for a spacecraft using both traditional and improved steering logic according to embodiments presented herein.

Turning now to FIG. 7, a set of plots illustrates offset quaternion command profiles for a spacecraft 110 using both traditional and improved steering logic according to embodiments disclosed herein. Plot 710 illustrates the first quaternion component of an offset command generated for the spacecraft 110. Trace 712 represents an example first quaternion component of an offset command generated from a traditional steering logic. Trace 714 illustrates an example first quaternion component of an offset command generated from an improved steering logic disclosed herein. Trace 712 represents an increased settling time due to the constant command. This effect may often be encountered using traditional steering logic approaches, while trace 714 demonstrates improved smooth slew performance and reduced settling time for the slew maneuver. Line 605 illustrates the point in time where the spacecraft 110 transitions from the rate control stage to the position and rate control stage. This is the time where the attitude of the spacecraft 110 crosses through the angle limit 160.

Plot 720 illustrates the second quaternion component of an offset command generated for the spacecraft 110. Trace 722 represents an example second quaternion component of an offset command generated from a traditional steering logic.

Trace 724 illustrates an example second quaternion component of an offset command generated from an improved steering logic disclosed herein. Trace 722 represents an increased settling time due to the constant command. This effect may often be encountered using traditional steering logic approaches, while trace 724 demonstrates improved smooth slew performance and reduced settling time for the slew maneuver.

Plot 730 illustrates the third quaternion component of an offset command generated for the spacecraft 110. Trace 732 represents an example third quaternion component of an offset command generated from a traditional steering logic. Trace 734 illustrates an example third quaternion component of an offset command generated from an improved steering logic disclosed herein. Trace 732 represents an increased settling time due to the constant command. This effect may often be encountered using traditional steering logic approaches, while trace 734 demonstrates improved smooth slew performance and reduced settling time for the slew maneuver.

Plot 740 illustrates the fourth quaternion component of an offset command generated for the spacecraft 110. Trace 742 represents an example fourth quaternion component of an offset command generated from a traditional steering logic. Trace 744 illustrates an example fourth quaternion component of an offset command generated from an improved steering logic disclosed herein. Trace 742 represents an increased settling time due to the constant command. This effect may often be encountered using traditional steering logic approaches, while trace 744 demonstrates improved smooth slew performance and reduced settling time for the slew maneuver.

Figure 8:
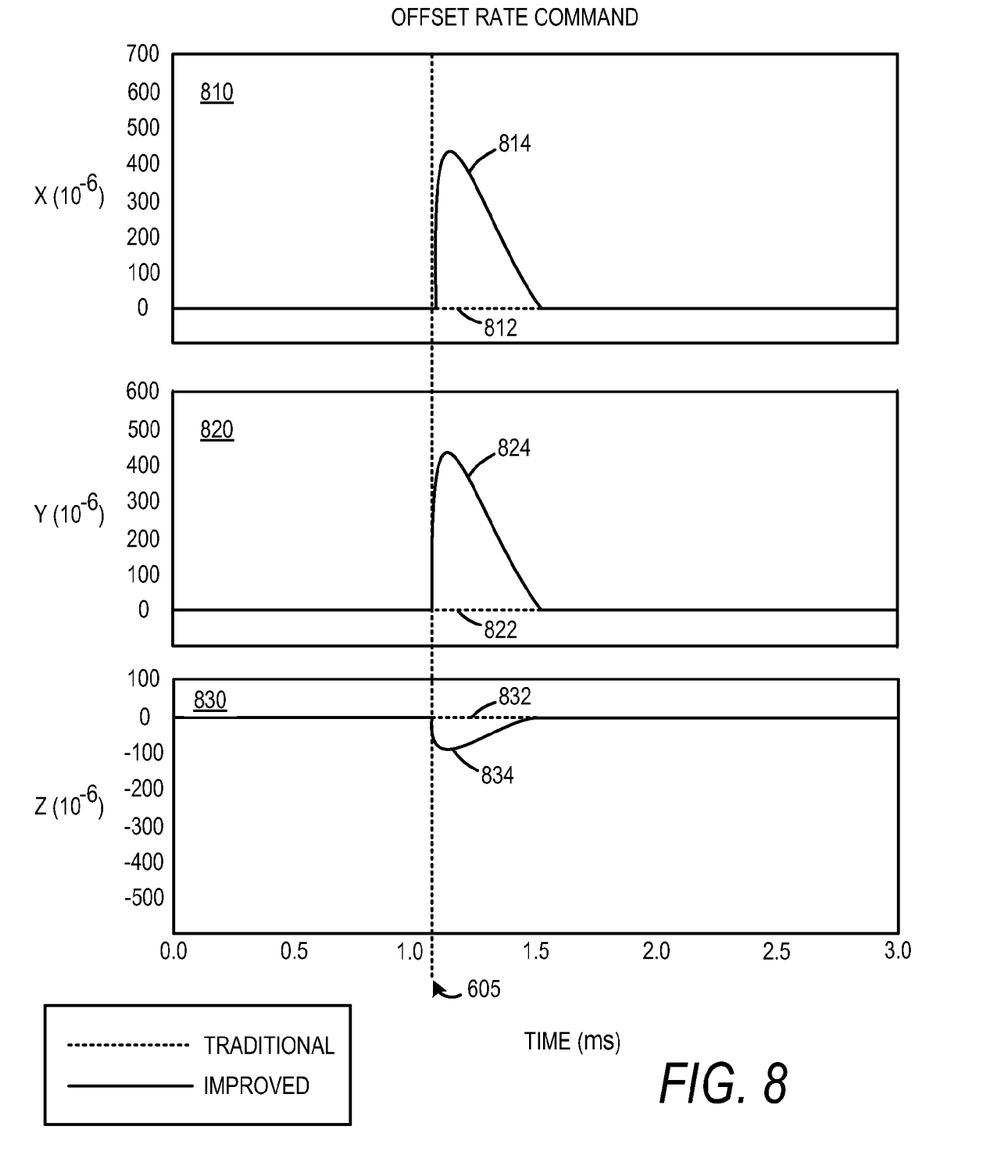
FIG. 8 is a set of plots illustrating offset rate command profiles for a spacecraft using both traditional and improved steering logic according to embodiments presented herein.

Turning now to FIG. 8, a set of plots illustrate offset rate command profiles for a spacecraft using both traditional and improved steering logic according to embodiments disclosed herein. Plot 810 illustrates the X component of an offset rate command generated for the spacecraft 110. Trace 812 represents an example X component of an offset rate command generated from a traditional steering logic. Trace 814 illustrates an example X component of an offset rate command generated from an improved steering logic disclosed herein. Trace 812 represents an increased settling time due to the constant command. This effect may often be encountered using traditional steering logic approaches, while trace 814 demonstrates improved smooth slew performance and reduced settling time for the slew maneuver. Line 605 illustrates the point in time where the spacecraft 110 transitions from the rate control stage to the position and rate control stage. This is the time where the attitude of the spacecraft 110 crosses through the angle limit 160.

Plot 820 illustrates the Y component of an offset rate command generated for the spacecraft 110. Trace 822 represents an example Y component of an offset rate command generated from a traditional steering logic. Trace 824 illustrates an example Y component of an offset rate command generated from an improved steering logic disclosed herein. Trace 822 represents an increased settling time due to the constant command. This effect may often be encountered using traditional steering logic approaches, while trace 824 demonstrates improved smooth slew performance and reduced settling time for the slew maneuver.

Plot 830 illustrates the Z component of an offset rate command generated for the spacecraft 110. Trace 832 represents an example Z component of an offset rate command generated from a traditional steering logic. Trace 834 illustrates an example Z component of an offset rate command generated from an improved steering logic disclosed herein. Trace 832 represents an increased settling time due to the constant command. This effect may often be encountered using traditional steering logic approaches, while trace 834 demonstrates improved smooth slew performance and reduced settling time for the slew maneuver.

Figure 9:
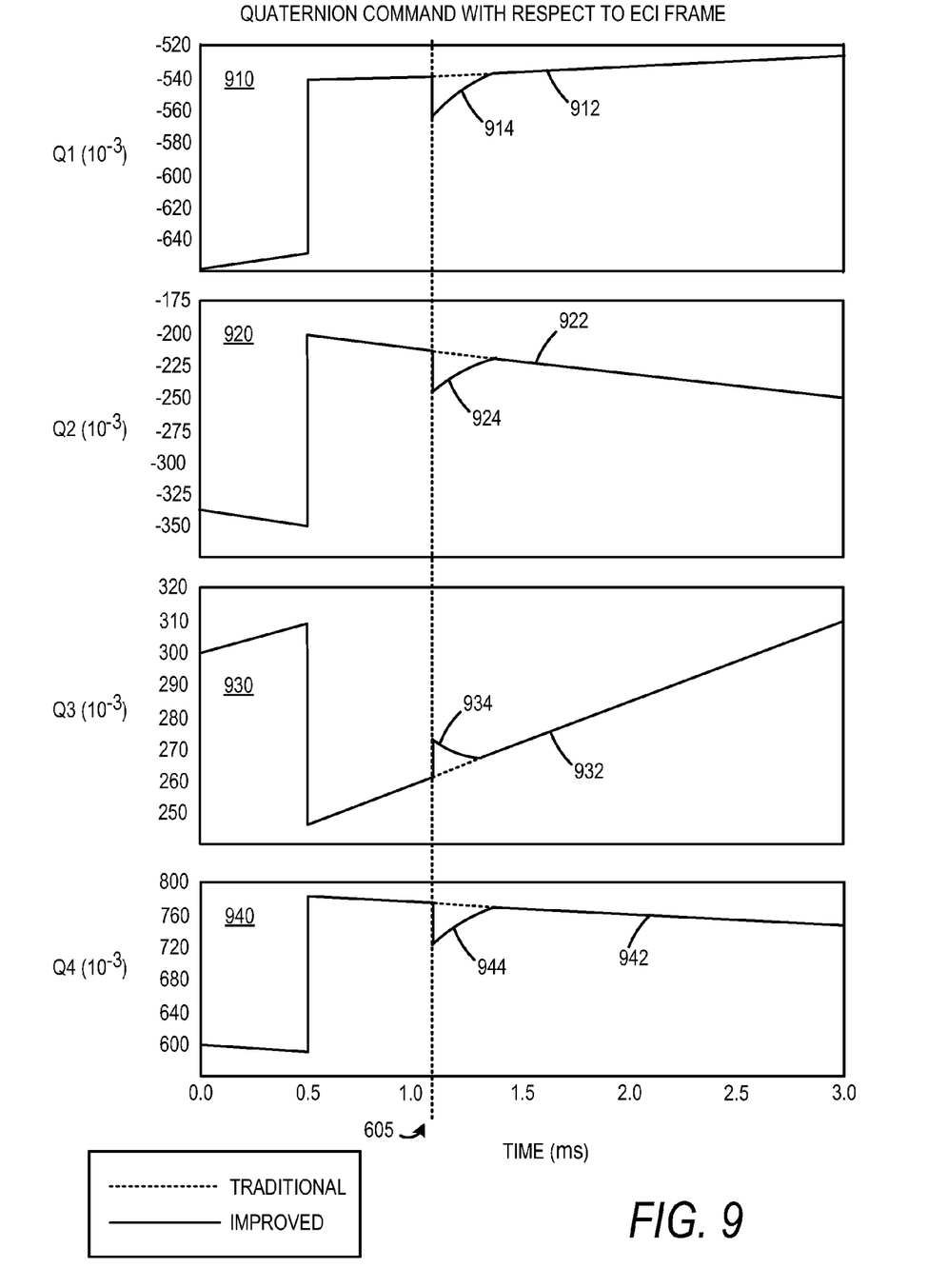
FIG. 9 is a set of plots illustrating a quaternion command profile in an Earth centered inertial frame using both traditional and improved steering logic according to embodiments presented herein.

Turning now to FIG. 9, a set of plots illustrate a quaternion command profile in an Earth centered inertial frame using both traditional and improved steering logic according to embodiments disclosed herein. Plot 910 illustrates the first quaternion component of an ECI frame quaternion command generated for the spacecraft 110. Trace 912 represents an example first quaternion component of an ECI frame quaternion command generated from a traditional steering logic. Trace 914 illustrates an example first quaternion component of an ECI frame quaternion command generated from an improved steering logic disclosed herein. Trace 912 represents an increased settling time often encountered while using traditional steering logic approaches, while trace 914 demonstrates improved smooth slew performance and reduced settling time for the slew maneuver. Line 605 illustrates the point in time where the spacecraft 110 transitions from the rate control stage to the position and rate control stage. This is the time where the attitude of the spacecraft 110 crosses through the angle limit 160.

Plot 920 illustrates the second quaternion component of an ECI frame quaternion command generated for the spacecraft 110. Trace 922 represents an example second quaternion component of an ECI frame quaternion command generated from a traditional steering logic. Trace 924 illustrates an example second quaternion component of an ECI frame quaternion command generated from an improved steering logic disclosed herein. Trace 922 represents an increased settling time often encountered while using traditional steering logic approaches, while trace 924 demonstrates improved smooth slew performance and reduced settling time for the slew maneuver.

Plot 930 illustrates the third quaternion component of an ECI frame quaternion command generated for the spacecraft 110. Trace 932 represents an example third quaternion component of an ECI frame quaternion command generated from a traditional steering logic. Trace 934 illustrates an example third quaternion component of an ECI frame quaternion command generated from an improved steering logic disclosed herein. Trace 932 represents an increased settling time often encountered while using traditional steering logic approaches, while trace 934 demonstrates improved smooth slew performance and reduced settling time for the slew maneuver.

Plot 940 illustrates the fourth quaternion component of an ECI frame quaternion command generated for the spacecraft 110. Trace 942 represents an example fourth quaternion component of an ECI frame quaternion command generated from a traditional steering logic. Trace 944 illustrates an example fourth quaternion component of an ECI frame quaternion command generated from an improved steering logic disclosed herein. Trace 942 represents an increased settling time often encountered while using traditional steering logic approaches, while trace 944 demonstrates improved smooth slew performance and reduced settling time for the slew maneuver.

Figure 10:
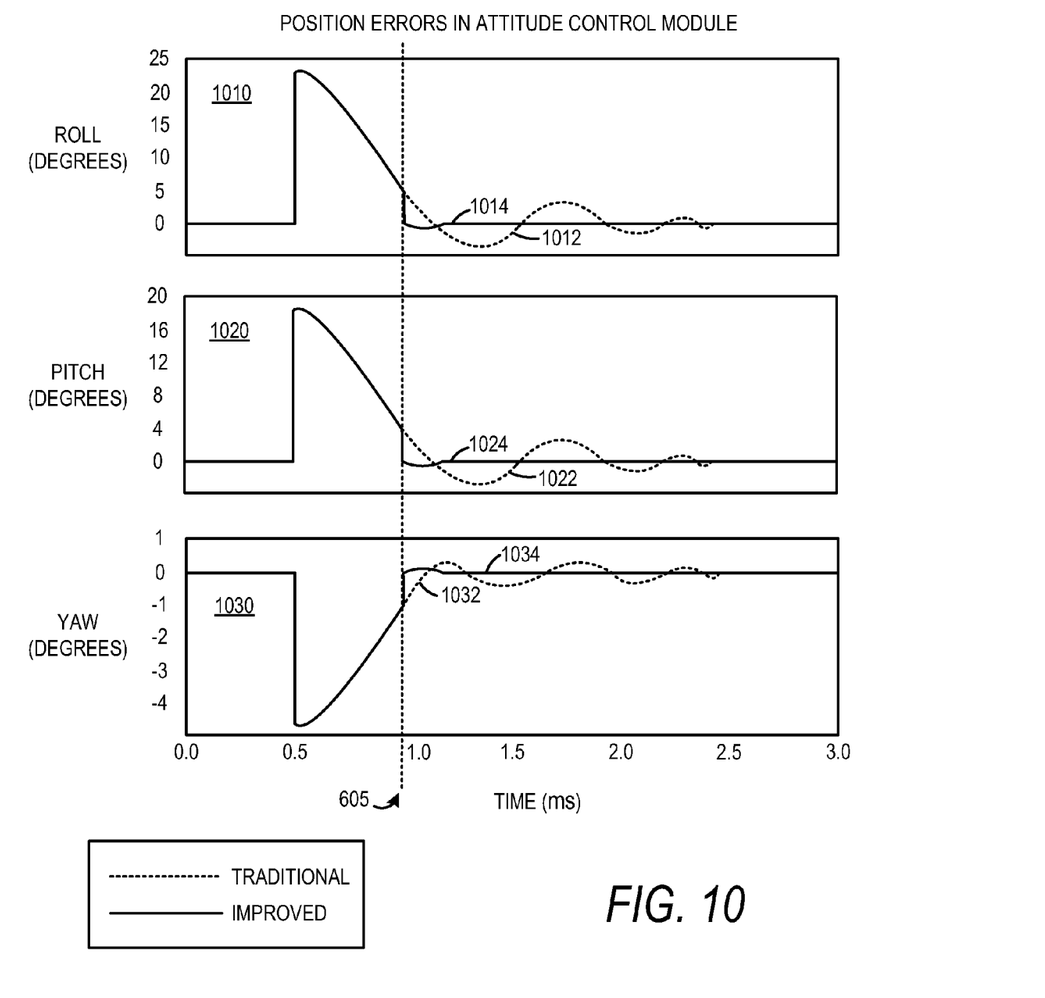
FIG. 10 is a set of plots illustrating attitude control position errors of a spacecraft using both traditional and improved steering logic according to embodiments presented herein.

Turning now to FIG. 10, a set of plots illustrate attitude control position errors of a spacecraft using both traditional and improved steering logic according to embodiments disclosed herein. Plot 1010 illustrates the roll component in degrees of an attitude control position error associated with the spacecraft 110. Trace 1012 represents an example roll component of an attitude control position error generated from a traditional steering logic. Trace 1014 illustrates an example roll component of an attitude control position error generated from an improved steering logic disclosed herein. The oscillation in trace 1012 represents overshoot and increased settling time often encountered while using traditional steering logic approaches, while trace 1014 demonstrates improved smooth slew performance and reduced settling time for the slew maneuver. Line 605 illustrates the point in time where the spacecraft 110 transitions from the rate control stage to the position and rate control stage. This is the time where the attitude of the spacecraft 110 crosses through the angle limit 160.

Plot 1020 illustrates the pitch component in degrees of an attitude control position error associated with the spacecraft 110. Trace 1022 represents an example pitch component of an attitude control position error generated from a traditional steering logic. Trace 1024 illustrates an example pitch component of an attitude control position error generated from an improved steering logic disclosed herein. The oscillation in trace 1022 represents overshoot and increased settling time often encountered while using traditional steering logic approaches, while trace 1024 demonstrates improved smooth slew performance and reduced settling time for the slew maneuver.

Plot 1030 illustrates the yaw component in degrees of an attitude control position error associated with the spacecraft 110. Trace 1032 represents an example yaw component of an attitude control position error generated from a traditional steering logic. Trace 1034 illustrates an example yaw component of an attitude control position error generated from an improved steering logic disclosed herein. The oscillation in trace 1032 represents overshoot and increased settling time often encountered while using traditional steering logic approaches, while trace 1034 demonstrates improved smooth slew performance and reduced settling time for the slew maneuver.

Figure 11:
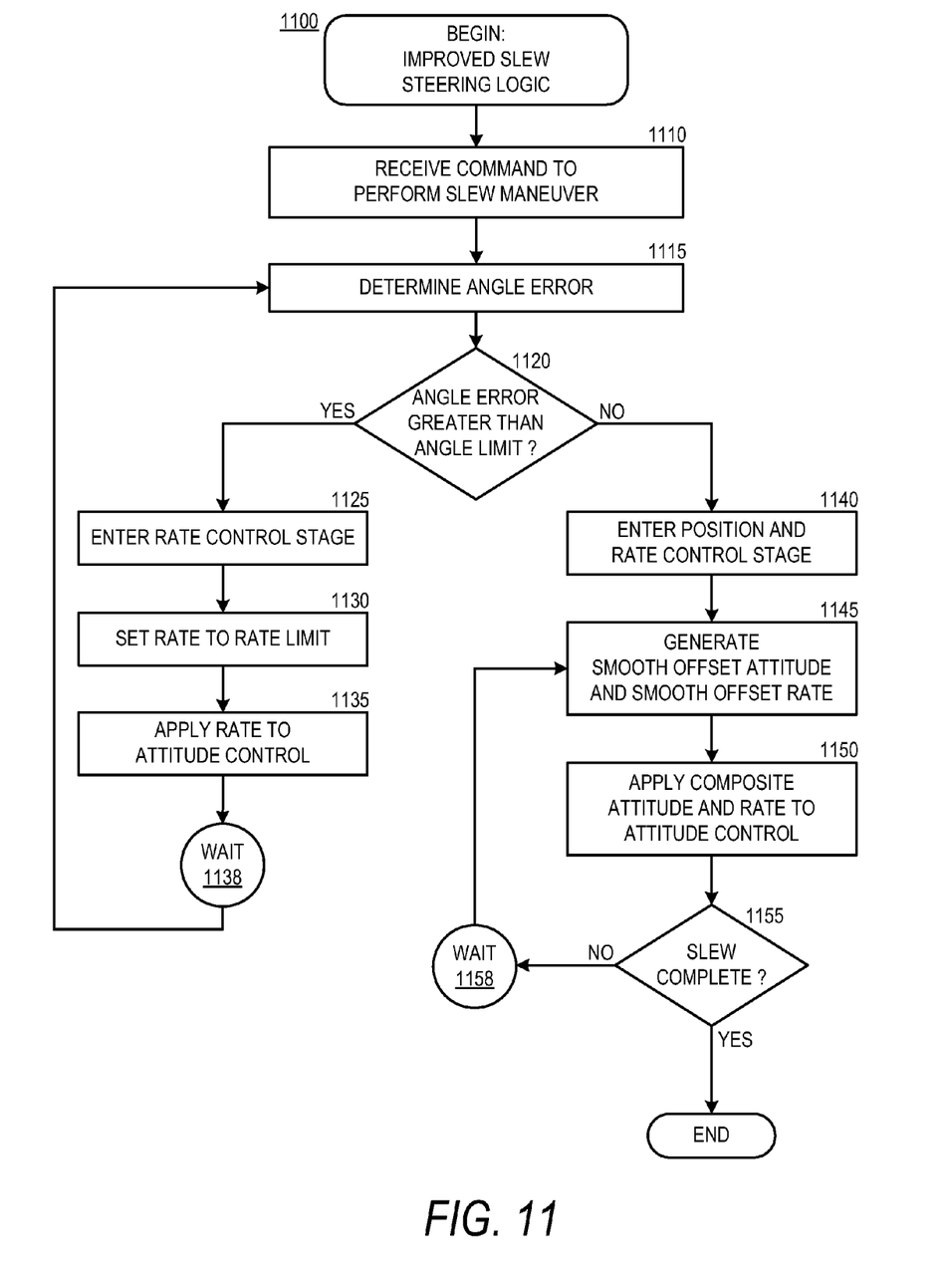
FIG. 11 is a logical flow diagram illustrating a process for improved spacecraft slew steering according to embodiments presented herein.

Turning now to FIG. 11, additional details will be provided regarding the embodiments presented herein for improved steering logic for space craft slew maneuvers. In particular, FIG. 11 is a flow diagram showing a routine 1100 that illustrates aspects of a process for improved slew steering logic according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in firmware, in special purpose digital logic, and any combination thereof It should also be appreciated that more or fewer operations may be performed than shown in the figures and described herein. These operations may also be performed in parallel, or in a different order than those described herein.

The routine 1100 can begin with operation 1110 where a command is received to perform a slew maneuver. The command may be received from a ground control station on Earth, or from any other control system associated with the spacecraft 110. The command may specify a target attitude 150 to which the spacecraft 110 is to be maneuvered. The target attitude 150 or other information specified within the command may be provided in any one of several reference frames. These frames may include the ECI frame, the steering frame, the spacecraft frame, or any other frame. The information may be transformed from the provided frame to the frame used for the steering operations presented below.

At operation 1115, an angle error of the spacecraft 110 may be determined. The angle error can be the difference between a current attitude of the spacecraft 110 and the target attitude 150. The target attitude may be derived from the slew maneuver command received in operation 1110. The angle error can be determined as an Euler angle to provide a single scalar value for conversion.

At operation 1120, an evaluation can be performed to determine if the angle error is greater than a specified angle limit 160. If the angle error is greater than the specified angle limit 160, the routine 1100 can continue to operation 1125 where the spacecraft is in a rate control stage.

At operation 1130, the rate control stage may be implemented by setting the slew rate of the spacecraft 110 to a specified rate limit. The rate limit can be a maximum angular velocity for the spacecraft 110 in this particular slew maneuver. The rate limit may be specified as a function of various operational parameters, physical limitations, physical characteristics, energy profiles, other spacecraft 110 parameters, other control parameters, or any combination thereof.

At operation 1135, the slew rate set in operation 1130 may be applied to an attitude control module 420 of the spacecraft 110. The attitude control module 420 can use the provided information to control slew actuators thereby effectuating physical motion of the spacecraft 110. Data provided to the attitude control module 420 may be provided in any one of several reference frames. These frames may include the ECI frame, the steering frame, the spacecraft frame, or any other frame. The information may be transformed from the provided frame to a frame used within the attitude control module 420.

After operation 1135, the routine 1100 can support a wait state 1138. The time period of the wait state 1138 may be associated with a timer, counter, real-time operating system, real-time interrupt, real-time clock, or any other timing or scheduling mechanism provided within the control system of the spacecraft 110. After the wait state 1138, the routine 1100 may loop back to operation 1115 where the angle error may be reestablished and the routine 1100 may continue as detailed above.

Returning to operation 1120, if the angle error is not greater than the specified angle limit 160, the routine 1100 can continue to operation 1140 where the spacecraft may enter a position and rate control stage.

At operation 1145, a smooth offset attitude and smooth offset rate can be generated. The smooth offset attitude and smooth offset rate may be generated using the smooth profile techniques presented herein. The smooth offset attitude may be specified using quaternion coordinates.

At operation 1150, the smooth offset attitude and smooth offset rate determined in operation 1145 may be applied, as a composite attitude and rate to the attitude control module 420 of the spacecraft 110. The attitude control module 420 can use the provided information to control slew actuators thereby effectuating physical motion of the spacecraft 110. Data provided to the attitude control module 420 may be provided in any one of several reference frames. These frames may include the ECI frame, the steering frame, the spacecraft frame, or any other frame. The information may be transformed from the provided frame to a frame used within the attitude control module 420.

At operation 1155, an evaluation may be performed to determine if the slew maneuver is complete. If the slew maneuver is complete, the routine 1100 may terminate. If, instead, the slew maneuver is not complete, the routine 1100 can enter a wait state 1158 prior to looping back to operation 1145, where the next offset values may be determined as detailed above. The time period associated with the wait state 1158 may be established by a timer, counter, real-time operating system, real-time interrupt, real-time clock, or any other timing or scheduling mechanism provided within the control system of the spacecraft 110.

Figure 12:
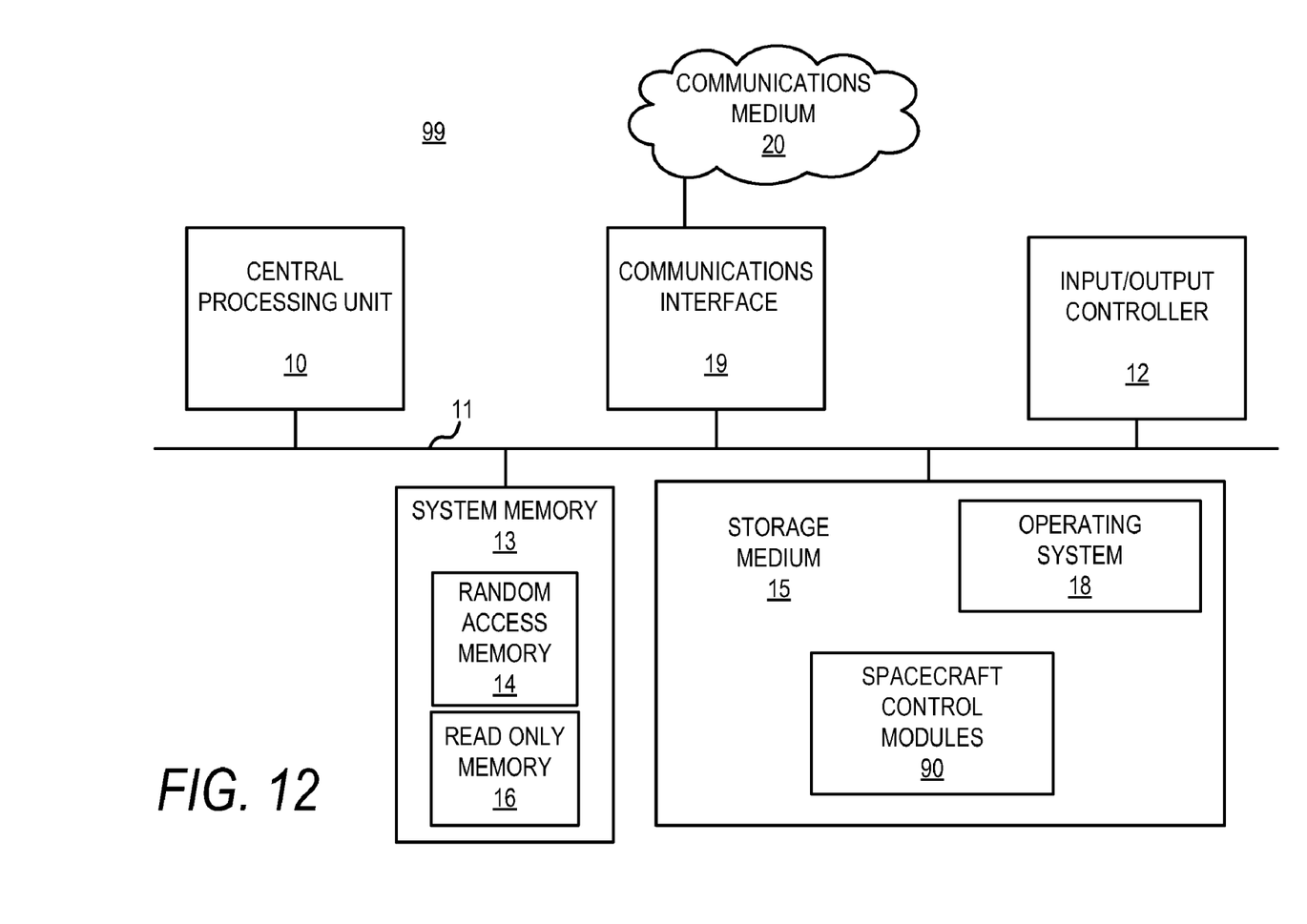
FIG. 12 is a computer architecture diagram illustrating computing system hardware capable of steering logic for performing spacecraft slew maneuvers according to embodiments presented herein.

Turning now to FIG. 12, an illustrative computer architecture 99 can execute software components described herein for improved slew maneuver steering logic. The computer architecture shown in FIG. 12 illustrates an embedded control computer, or flight computer 99 associated with the spacecraft 110. The flight computer 99 may be utilized to execute aspects of the software components presented herein. It should be appreciated however, that the described software components can also be executed on other computing environments.

The flight computer 99 architecture illustrated in FIG. 12 can include a central processing unit 10 (CPU), a system memory 13, including a random access memory 14 (RAM) and a read-only memory 16 (ROM), and a system bus 11 that can couple the system memory 13 to the CPU 10. A basic input/output system containing the basic routines that help to transfer information between elements within the computer 99, such as during startup, can be stored in the ROM 16. The flight computer 99 may further include a storage medium 15 for storing an operating system 18, software, data, and various program modules, such as those associated with spacecraft control modules 90. The spacecraft control modules 90 may include the bus steering module 410, the attitude control module 420, and various modules configured to support the steering logic techniques presented herein.

The storage medium 15 can be connected to the CPU 10 through a storage controller (not illustrated) connected to the bus 11. The storage medium 15 may comprise computer-readable media configured to support non-volatile storage for the flight computer 99.

Although the description of computer-readable media contained herein refers to a storage device, such as non-volatile memory, it should be appreciated by those skilled in the art that computer-readable media can be any available computer storage media that can be accessed by the flight computer 99 or used to configure or load the flight computer 99. By way of example, and not limitation, these computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by, or used to configure, the flight computer 99.

The flight computer 99 may support logical connections to remote computers through a communications medium 20 such as a wireless radio command and control link. The flight computer 99 may connect to the communications medium 20 communications interface 19 connected to the bus 11.

The flight computer 99 may also include an input/output controller 12 for receiving and processing input from various devices, interfaces, or peripherals (not illustrated). Similarly, the input/output controller 12 may provide output various devices, interfaces, or peripherals (also not illustrated).

Based on the foregoing, it should be appreciated that technologies for improved spacecraft slew maneuver steering logic are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for steering a spacecraft during a slew maneuver, the method comprising:
   receiving a target attitude;
   determining an angle error between a current attitude and the target attitude;
   establishing a fixed rotational rate in response to the angle error exceeding a specified angle limit;
   establishing a smooth attitude offset profile from the current attitude to the target attitude, wherein the smooth attitude offset profile comprises a sinusoidal function;
   generating a smooth attitude command from the smooth attitude offset profile; and
   applying the smooth attitude command to an attitude control module of the spacecraft.

2. The method of claim 1, wherein the smooth attitude offset profile comprises a continuous smooth function.

3. The method of claim 1, wherein the sinusoidal function comprises $$\theta(t) = \frac{\theta_f}{\pi}\sin\left(\frac{\pi}{\Delta T}t\right) + \frac{\theta_f}{\Delta T}t$$

where $\theta_f$ is the target attitude and $\Delta T$ is an amount of time to complete a transition from the current attitude to the target attitude.

4. The method of claim 1, wherein the smooth attitude offset comprises a quaternion attitude.

5. The method of claim 1, further comprising establishing a smooth rate offset profile by differentiating the smooth attitude offset profile.

6. The method of claim 1, further comprising deriving a next smooth attitude offset after a time delay.

7. The method of claim 1, wherein the fixed rotational rate comprises an angular rate limit.

8. The method of claim 1, wherein the attitude control module is configured to control one or more slew actuators associated with the spacecraft.

9. A non-transitory computer-readable storage medium having computer-executable instructions stored thereon which, when executed by a computer system, cause the computer system to:
   receive a target attitude for a spacecraft slew maneuver;
   determine an angle error between a current attitude and the target attitude;

establish a fixed rotational rate in response to the angle error exceeding a specified angle limit;

establish a smooth attitude offset profile from the current attitude to the target attitude; wherein the smooth attitude offset profile comprises a sinusoidal function;

generate a smooth attitude command from the smooth attitude offset profile; and apply the smooth attitude command to an attitude control module of the spacecraft.

10. The non-transitory computer-readable storage medium of claim 9, wherein the smooth attitude offset profile comprises a continuous smooth function.

11. The non-transitory computer-readable storage medium of claim 9, wherein the sinusoidal function comprises $$\theta(t) = \frac{\theta_f}{\pi} \sin\left(\frac{\pi}{\Delta T} t\right) + \frac{\theta_f}{\Delta T} t$$

where $\theta_f$ is the target attitude and $\Delta T$ is an amount of time to complete a transition from the current attitude to the target attitude.

12. The non-transitory computer-readable storage medium of claim 9, wherein the smooth attitude offset comprises a quaternion attitude.

13. The non-transitory computer-readable storage medium of claim 9, wherein the computer system is further caused to establish a smooth rate offset profile by differentiating the smooth attitude offset profile.

14. The non-transitory computer-readable storage medium of claim 9, wherein the computer system is further caused to derive a next smooth attitude offset after a time delay.

15. The non-transitory computer-readable storage medium of claim 9, wherein the fixed rotational rate comprises an angular rate limit.

* * * * *